United States Patent
Wilcox et al.

(10) Patent No.: US 8,022,337 B2
(45) Date of Patent: Sep. 20, 2011

(54) IGNITOR PLUG ASSEMBLY

(75) Inventors: Ernest W. Wilcox, Lake Park, FL (US); Nigel MacDonald, Plantation, FL (US)

(73) Assignee: Locust, USA, Inc., Miami, FL (US)

( * ) Notice: Subject to any disclaimer, the term of this patent is extended or adjusted under 35 U.S.C. 154(b) by 749 days.

(21) Appl. No.: 12/136,334

(22) Filed: Jun. 10, 2008

(65) Prior Publication Data

US 2009/0302022 A1    Dec. 10, 2009

(51) Int. Cl.
- F23Q 13/00 (2006.01)
- F23Q 7/00 (2006.01)
- F23Q 7/22 (2006.01)

(52) U.S. Cl. .................. 219/264; 219/260; 219/270

(58) Field of Classification Search .................. 219/264, 219/260, 261, 262, 263, 265, 266, 267, 268, 219/269, 270
See application file for complete search history.

(56) References Cited

U.S. PATENT DOCUMENTS

| | | | |
|---|---|---|---|
| 2,024,387 A | 12/1935 | Rabezzana | |
| 2,546,919 A | 3/1951 | Carrington et al. | |
| 3,689,195 A | 9/1972 | Beesch et al. | |
| 3,996,915 A | 12/1976 | Demetrescu | |
| 4,088,105 A | 5/1978 | Bhat et al. | |
| 4,095,580 A | 6/1978 | Murray et al. | |
| 4,336,686 A | 6/1982 | Porter | |
| 4,345,555 A | 8/1982 | Oshima et al. | |
| 4,380,218 A | 4/1983 | Munro | |
| 4,556,781 A * | 12/1985 | Bauer | 219/270 |
| 4,604,975 A | 8/1986 | Frey et al. | |
| 5,063,898 A | 11/1991 | Elliott | |
| 5,075,536 A | 12/1991 | Towe et al. | |
| 5,084,606 A | 1/1992 | Bailey et al. | |
| 5,085,804 A | 2/1992 | Washburn | |
| 5,182,437 A | 1/1993 | Schmid et al. | |
| 5,245,959 A | 9/1993 | Ringenbach | |
| 5,497,744 A | 3/1996 | Nagaosa et al. | |
| 5,521,356 A * | 5/1996 | Bauer | 219/270 |
| 5,715,788 A | 2/1998 | Tarr et al. | |
| 5,909,723 A | 6/1999 | Ichimoto et al. | |
| 6,289,869 B1 | 9/2001 | Elliott | |
| 6,439,191 B1 | 8/2002 | Elliott | |
| 6,660,971 B2 | 12/2003 | Terada et al. | |
| 6,878,903 B2 * | 4/2005 | Duba | 219/270 |
| 6,884,967 B1 | 4/2005 | Leigh | |
| 6,900,412 B2 | 5/2005 | Taniguchi et al. | |
| 2002/0043524 A1 | 4/2002 | Taniguchi et al. | |
| 2002/0130119 A1 | 9/2002 | Girlando et al. | |
| 2005/0053884 A1 | 3/2005 | Schmiedlin et al. | |

\* cited by examiner

Primary Examiner — Daniel Robinson
(74) Attorney, Agent, or Firm — Gordon & Jacobson, PC

(57) ABSTRACT

An improved ignitor plug for igniting fuel in a combustion chamber and a smart fuel supply system for ignitor plug applications.

30 Claims, 4 Drawing Sheets

IGNITOR PLUG ASSEMBLY

BACKGROUND OF THE INVENTION

1. Field of the Invention

This invention relates broadly to mechanisms for igniting fuel in a combustion chamber. More particularly, this invention relates to ignitor plugs that utilize resistive heating to ignite a combustible fuel supplied thereto.

2. State of the Art

Small turbine engines and other rotary engines commonly utilize an ignitor plug employing resistive heating to ignite a combustible fuel in a combustion chamber. The resulting flame produced by the burning fuel in the combustion chamber ignites heavy liquid fuel that is introduced into the combustion chamber. The combustible fuel supplied to the ignitor plug is then shut off, and the engine continues to run on the heavy liquid fuel supplied to the combustion chamber. This type of ignitor plug is typically referred to as a glow plug, examples of which are sold commercially under the trade name O.S. Engines by Great Planes Model Distributors of Champaign, Ill.

As the resistive heating employed by prior art glow plugs will not ignite heavy liquid fuels that are required to run the engine, an additional fuel system is required to start the engine. The additional fuel system significantly increases the operational cost and weight of such engines. Glow plugs that ignite heavy fuel have been utilized in large diesel engines to heat the combustion air to aid in starting the engine. However, these prior art glow plugs typically use high amperage D.C. voltages, are very large and heavy, and are not compatible with small-size turbine engines. In addition, they are subject to coking of the fuel path through the igniter plug, which reduces the operational lifetime of the igniter plug and increases the operational costs of such engines.

SUMMARY OF THE INVENTION

An ignitor plug is provided that ignites fuel in a combustion chamber. The ignitor plug has at least one elongate member that defines an internal fuel channel. The at least one elongate member supports a conductive wire loop that has a heater coil and an ignitor coil electronically coupled in series. The heater coil is operably disposed inside the internal fuel channel and in direct contact with fluid fuel flowing therethrough for resistive heating therein. The ignitor coil is disposed downstream of the internal fuel channel for igniting the fluid fuel as it exits from the internal fuel channel.

In the preferred embodiment, the at least one elongate member includes an inner tubular member that is surrounded by a hollow outer support member that supports the inner tubular member preferably in a position offset from the top edge of the outer support member. In this preferred configuration, the internal space of the inner and outer members defines the internal fuel channel, which starts near the top edge of the outer support member and extends along the central axis of the inner and outer members. The heater coil of the conductive wire loop is disposed inside the inner tubular member. The ignitor coil is disposed downstream of the inner and outer members, adjacent to the exit of the internal fuel channel. Two terminals are disposed on an exterior surface of the outer member preferably at locations above the radial projection of the top edge of the inner tubular member. The two terminals are electronically coupled to ends of the conductive wire loop such that a voltage applied across the two terminals supplies current through the conductive wire loop, thus activating the heater and ignitor coils. In the preferred embodiment, the heater coil extends inside the internal fuel channel along a substantial portion of the lengthwise dimension of the inner tubular member. This arrangement provides for rapid thermal heating of the fuel within the ignitor plug with lower power consumption. In addition, the inner tubular member acts as an electrical insulator between the heater coil and the other portions of the conductive wire loop, which helps prevent electrical shorts therein.

According to one embodiment, the conductive wire loop has a resistance in the range of 1.7 to 2.2 ohms, provides for resistive heating to a temperature in the range of 1300 to 1400° F, and expends less than 30 watts of electrical power when activated. These parameters are sufficient to vaporize and ignite a wide range of heavy liquid combustible fuels (including jet fuel) with reduced power requirements. Moreover, liquid fuel is vaporized rapidly such that coking of the fuel channel through the ignitor plug is significantly reduced.

BRIEF DESCRIPTION OF THE DRAWINGS

FIG. 3 depicts the start-up mode operations carried out by the system; and FIG. 4 depicts the normal-ON mode operations carried out by the system.

DETAILED DESCRIPTION OF THE PREFERRED EMBODIMENTS

Figure 1:
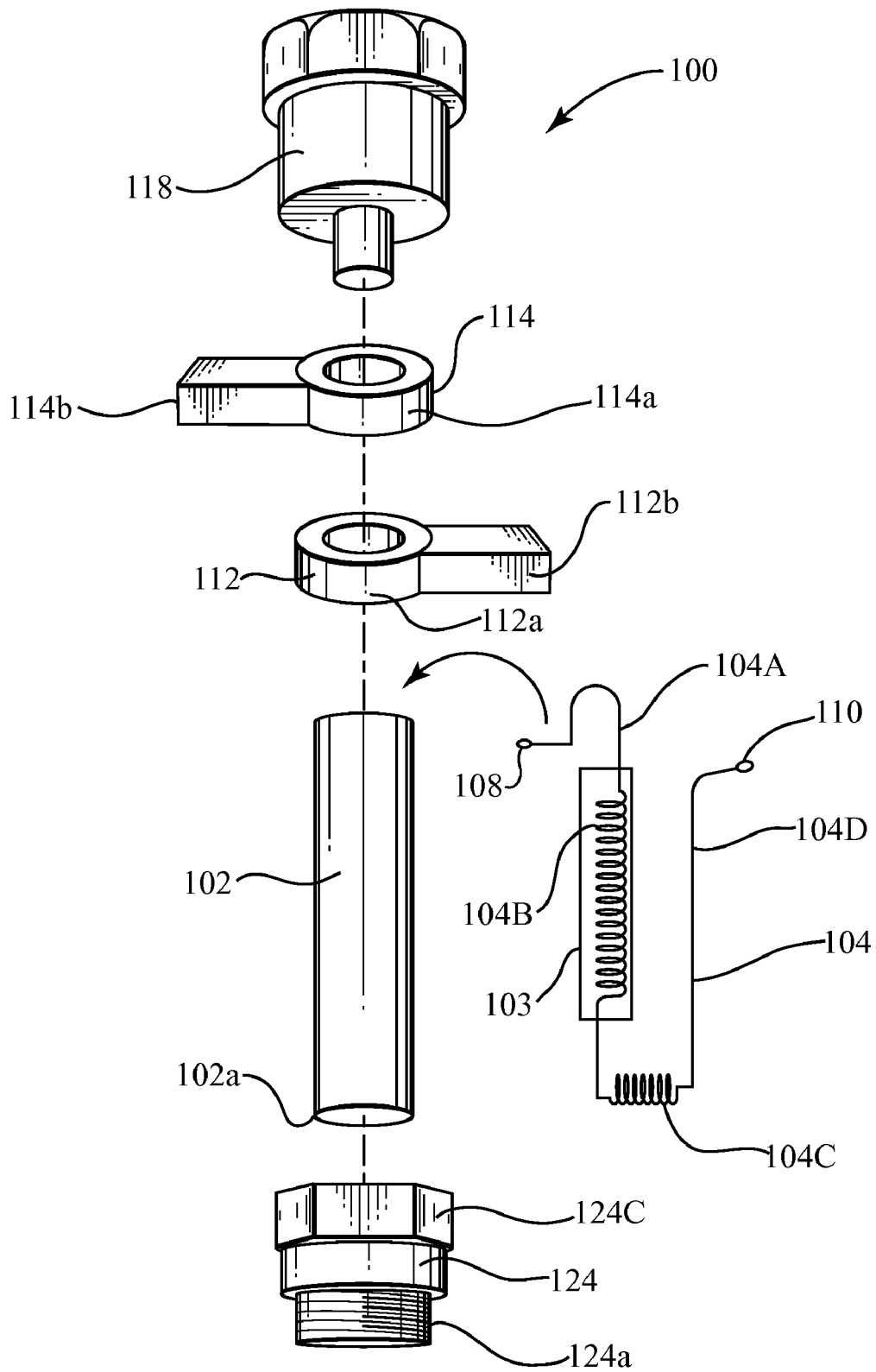
FIG. 1 is an exploded view of an ignitor plug in accordance with the present invention.
Figure 2:
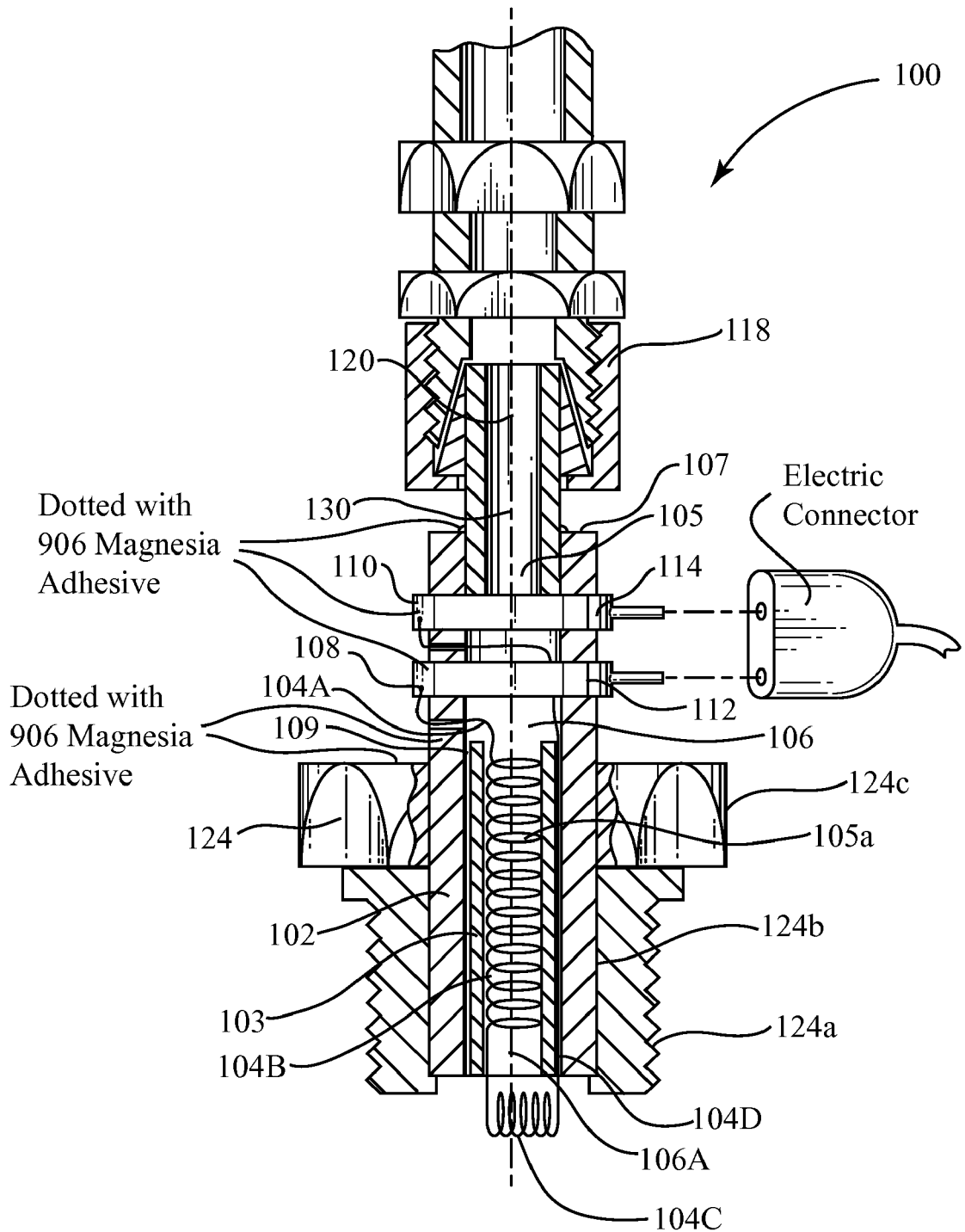
FIG. 2 is a partial cross-sectional view of the ignitor plug of FIG. 1.

Turning now to FIGS. 1 and 2, an ignitor plug 100 in accordance with the present invention includes an outer support tube 102 that surrounds an inner tube 103 and conductive wire loop 104 operably disposed therein. The inner tube 103 is preferably hollow, cylindrical, and made from an electrically insulating ceramic material such as omega ceramic tubing p/n orx132116, which can withstand the extremely high temperatures involved and is electrically insulating. The inner tube 103 preferably has a 0.061" inner diameter and a 0.093" outer diameter. The outer support tube 102 is preferably hollow, cylindrical, and also made from an electrically insulating ceramic material such as Ortech ceramic tubing made from Alumina material. The outer support tube 102 preferably has a 0.156" outer diameter and a 0.103" inner diameter. In the preferred embodiment, the inner tube 103 is disposed inside of the outer support tube 102 and recessed at a lower portion 105a of an interior portion 105 of the outer support tube 102. The inner and outer tubes 103, 102 define a fuel channel 106 that starts at a top edge 107 of the outer support tube 102 and extends along a longitudinal central axis 130 of the outer and inner tubes 102, 103 such that fuel passing therethrough is in direct contact with the interior walls of the outer and inner tubes 102, 103. The inner tube 103 can be supported within the outer tube 102 by an interference fit and/or by an adhesive (e.g., an insulating adhesive such as a magnesia adhesive compound, for example, 906 magnesia adhesive compound sold commercially by Cotronics Corp. of Brooklyn, N.Y.). A seal can be formed at a top edge 109 of the inner tube 103 such that fuel supplied to the fuel channel 106 passes inside the inner tube 103 without leaking around the top edge 109. The seal can be realized from an insulating adhesive (such as a magnesia adhesive compound, for example, 906 magnesia adhesive compound sold commercially by Cotronics Corp. of Brooklyn, N.Y.). The seal can also provide mechanical coupling between the inner tube 103 and the outer tube 102.

The fuel channel 106, in addition to providing a path for fuel flowing through the outer and inner tubes 102, 103, also provides a thru-path for portions of the conductive wire loop 104. One portion of the conductive wire loop 104 is disposed inside of the inner tube 103 while another portion is disposed between the outer and inner tubes 102, 103 in order to electrically insulate the portions of the conductive wire loop 104 as further discussed below.

The conductive wire loop 104 can be logically partitioned into four series-coupled sections 104A, 104B, 104C, 104D. The first section 104A of the conductive wire loop 104 extends from a second terminal 112 on an exterior surface of the outer tube 102 through a hole drilled through the outer tube 102 and over the top edge 109 of the inner tube 103. Preferably, the first section 104A is connected to the second terminal 112 by spot welding or other suitable means. The second section 104B (referred to below as a "heating coil") is wound in a helical coil shape which is operably disposed along the fuel channel 106 inside of the inner tube 103, and substantially extends along the length of the inner tube 103. The second section 104B acts as a heating coil which directly contacts and heats fuel flowing through the fuel channel 106 such that the fuel is vaporized as it exits the fuel channel 106. The third section 104C (referred to below as an "ignitor coil") starts at an end of the heating coil 104B and drops down to a location downstream of the outer and inner tubes 102, 103, and winds into a helical coil shape adjacent to the outlet (exit) 106A of the fuel channel 106. The ignitor coil 104C operates to ignite vaporized fuel exiting the fuel channel 106. The fourth section 104D extends from an end of the ignitor coil 104C upward between the inner tube 103 and the outer tube 102 and then through a hole in the outer tube 102 for connection to a first terminal 1 14. The fourth section 104D may extend upward in an annulus between the outer and inner tubes 102, 103 as shown in FIG. 2, or possibly through a channel in the wall of the inner tube 103 or outer tube 102, or possibly through space between the outer and inner tubes 102, 103 defining by grinding a flat on the exterior surface of the inner tube 103. An insulating adhesive may be provided between the inner tube 103 and the outer tube 102 such that the fourth section 104D passes through the adhesive en route to the first terminal 110. Preferably the fourth section 104D is connected to the first terminal 114 by spot welding or other suitable means. Importantly, the fourth section 104D is electrically insulated from the heater coil 104B by the inner cylinder 103 and possibly by insulating adhesive. Insulating adhesive can also be used to plug the holes through the outer tube 102 that enable passage of the sections 104A, 104D so that fuel flowing through the fuel path 106 will not leak out of the outer tube 102.

The terminals (112, 114) are mounted to the exterior surface of the annular wall of the outer tube 102 and are preferably made from copper. In the preferred embodiment, the terminals 112, 114 have cylindrical portions 112a, 114a that slide over the outer surface of the outer tube 102, and tab portions 112b, 114b projecting away from the outer tube 102. The cylindrical portions are secured to the outer tube 102 by using insulating adhesive. The first end 108 of the conductive wire loop 104 is connected to the second terminal 112 and the return end 110 of the conductive wire loop 104 is connected to the first terminal 114. The insulating adhesive may also used to insulate the two terminals 112, 114 and the two ends 108, 110 of the conductive wire loop from each other. Advantageously, the insulating adhesive of the above configuration electrically insulates various portions of the conductive wire loop 104 from one another, thus minimizing the risk of electrical shorts therein.

Figure 3:
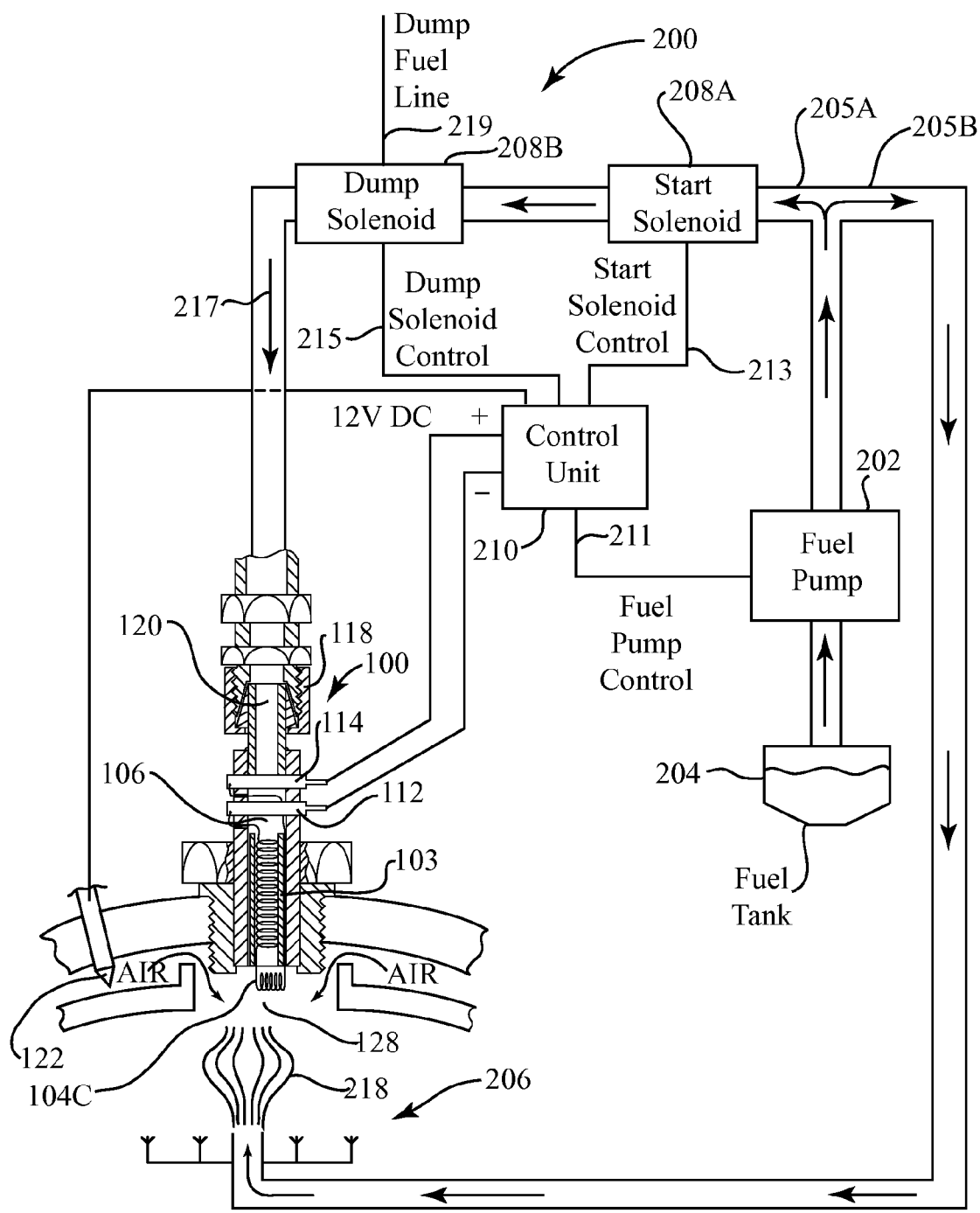
FIGS. 3 and 4 are schematic views of an automatic fuel supply system that employs the ignitor plug of FIGS. 1-2.

A bottom portion 102a of the outer tube 102 is supported by a lower member 124 and is preferably secured thereto by the insulating adhesive. The lower member 124 defines an axial bore 124b for supporting the outer tube 102, an exterior shoulder 124c that interfaces to a common wrench or other tool for installation and removal, and an exterior threaded male surface 124a that is received by a threaded port (not shown) leading to a combustion chamber 128 (FIG. 3). The axial bore 124b defines a step in the lower member 124 for supporting the outer and inner tubes 102, 103. The ignitor coil 104C is disposed downstream of the exit of the outer tube 102, preferably just below the threaded male surface 124a of the lower member 124 as best shown in FIG. 2.

Figure 4:
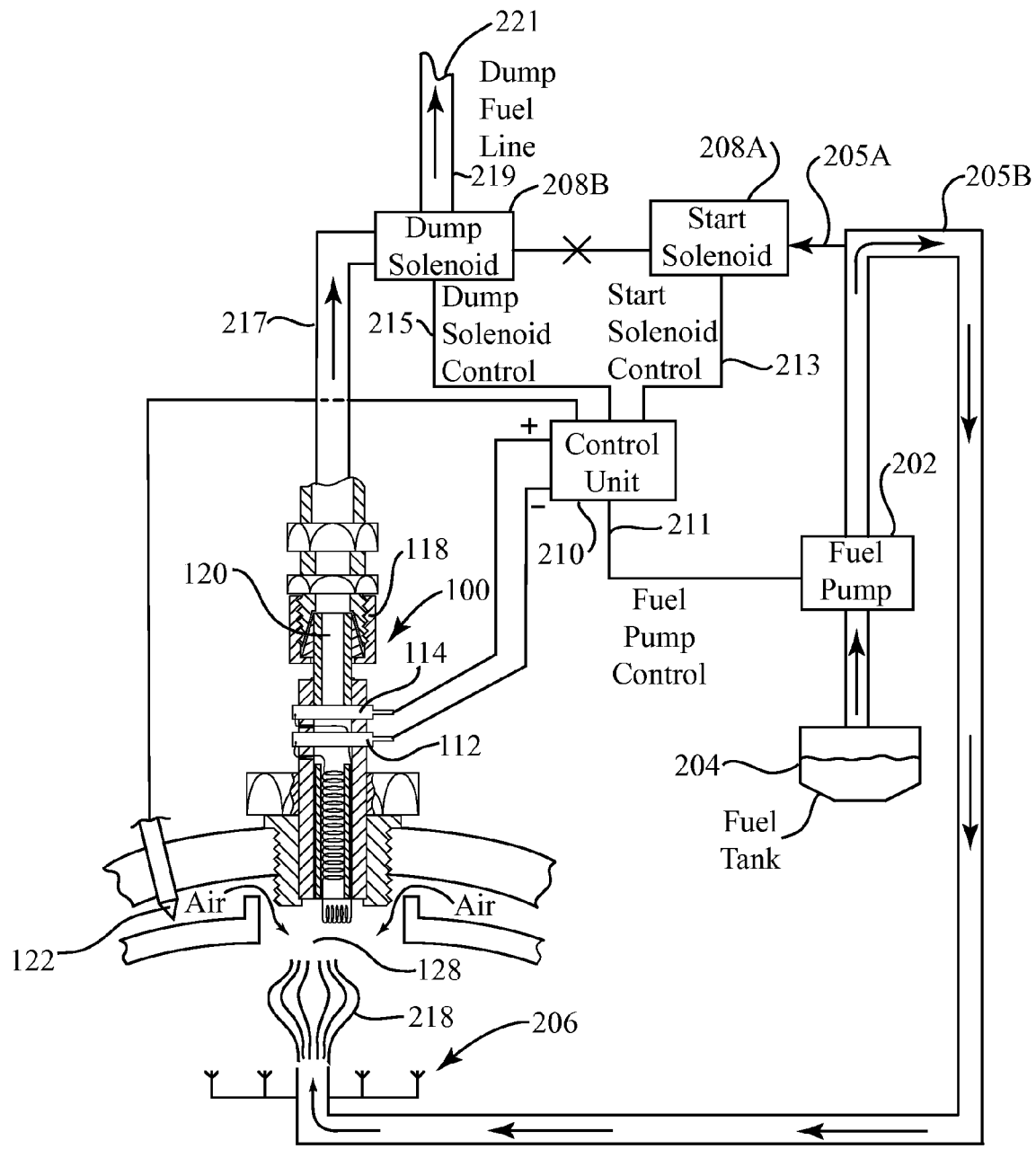

A fuel line coupler 118 is mated to the top edge 107 of the outer tube 102 by an interference fit or other suitable fixation means. The fuel line coupler 118 may be any standard multi-piece fuel line connector known in the art for connecting to a fuel line. The fuel line coupler 118 defines an internal channel 120 in fluid communication with the fuel channel 106 of the outer and inner tubes 102, 103 and the fuel channel 106 therein. The fuel line coupler 118 provides coupling to a fuel supply line 205A (FIGS. 3, 4). During start-up operations as described below, the fuel flows from the fuel supply line 205A to the internal channel 120 of the fuel coupler 118 and into the fuel channel 106 of the outer and inner tubes 102, 103. The fuel continues to flow to the lower end of the inner tube 103 where it is ejected therefrom.

As liquid fuel flows through the fuel channel 106 of the inner tube 103, it comes into direct contact with the heater coil 104B of the conductive wire loop 104. Heat is generated in the heating coil 104B through the heating coil's resistance to the current induced in the conductive wire loop 104 through the application of a voltage across the terminals 112, 114. The heating coil 104B operates to apply sufficient heat directly to fuel flowing through the fuel channel 106 of the inner tube 103 such that the fuel vaporizes prior to exiting the tube 103. The inner tube 103 acts as a thermal conduit, which assists in heating the fluid.

As the fuel exits the fuel channel 106 of the inner tube 103, it mixes with air and comes into direct contact with the ignitor coil 104C. The current passing through the conductive wire loop 104 also causes the igniter coil 104C to heat to a high temperature sufficient to ignite the fuel vapor that is ejected from the internal fuel channel 106 and mixed with air. The flame from the burning fuel ignited by the ignitor coil 104C ignites liquid fuel that flows into the combustion chamber 128 from a second fuel supply line 205B (FIGS. 3, 4).

During start-up operations, a pulsed voltage signal is preferably applied across the two terminals 112, 114 of the conductive wire loop 104, which causes current pulses to flow through the conductive wire loop 104. Alternatively, a DC supply voltage may be applied across the terminals 112, 114 to induce a DC current in the conductive wire loop 104. Supplying voltage pulses across the terminals 112, 114 rather than a DC supply voltage may increase the life of the ignitor plug 100 as much as tenfold. The amount of current flowing through the conductive wire loop 104 is governed by the electrical resistance afforded by the conductive wire loop 104 in accordance with Ohm's Law. The conductive wire loop 104 is adapted to control the electrical resistance realized by the conductive wire loop 104 in order to provide the desired heating characteristics. The application of the pulsed voltage signal across the terminals 112, 114, as well as the resistance heating and ignition provided by the conductive wire loop 104 expends significantly less power than the prior art designs. This reduced power requirement allows for the use of lightweight power supplies and thus reduces the overall weight of the system.

In the preferred embodiment, heavy liquid fuel (such as liquid jet fuel, kerosene or diesel) is supplied to the ignitor plug 100 and the heat applied to the liquid fuel by the conductive wire loop 104 is sufficient such that the heavy liquid fuel supplied thereto is substantially vaporized within the fuel channel 106 and thus is ejected from the fuel channel 106 in a vapor form. The heating temperature of the fuel channel 106 must remain high enough to heat the heavy liquid fuel into vapor and minimize the amount of fuel that remains on the wall of the fuel channel 106. Excess fuel remaining therein may cause coking, which can inhibit the fluid from flowing properly through the fuel channel 106. The number of turns of the heating coil 104B of the conductive wire loop 104 and the thermal conductivity of the inner tube 103 effect the heating temperature of the fuel channel 106.

The conductive wire loop 104 is preferably realized by 0.010" diameter nichrome wire of approximately 4.1 inches, which provides a total resistance in the range of 1.7 to 2.7 ohms at the desired operating temperatures discussed below. Other metal wires suitable for high temperature resistive heating can also be used, including platinum and tungsten. The temperatures of the heater coil 104B and the ignitor coil 104C are also determined by the resistance and length of the wire of the heater coil 104B and the ignitor coil 104C, respectively. In the preferred embodiment, the resistance and length of the heater coil 104B are selected such that the operating temperature of the heater coil 104B is in the range of 1,300° F. to 1,400° F, and the resistance and length of the ignitor coil 104C are selected such that the operating temperature of the ignitor coil 104C is in the range of 1,300° F. to 1,400° F. The preferred voltage applied across the terminals 112, 114 to produce these temperatures is 7.5 Volts, with the heater coil 104B having a resistance in the range of 1.0-1.5 ohms, and the ignitor coil having a resistance in the range of 0.7-1.2 ohms. Operating the heater coil 104B and ignitor coil 104C at these voltage levels allows the ignitor plug 100 to ignite vaporized heavy liquid fuel while expending less than 30 watts of power.

Advantageously, the high heating temperature generated by the conductive wire loop 104 significantly reduces the susceptibility of fuel coking in the fuel channel 106. The application of a pulsed voltage across the terminals 112, 114 increases the life of the conductive wire loop 104. The outer tube 102, inner tube 103, and lower member 124 of the ignitor plug 100 are preferably sized and shaped such that the ignitor plug 100 is directly interchangeable with existing glow plugs for small-size turbine engines.

The ignitor plug 100 as described herein is preferably employed as part of a smart fuel supply system 200 as shown in FIGS. 3 and 4. The smart fuel supply system 200 includes a fluid pump 202 that is fluidly coupled to a fuel tank 204 that stores heavy liquid fuel such as jet fuel, kerosene or diesel. The output of the fuel pump branches along two fluid supply lines 205A, 205B. The first fluid supply line 205A leads to the ignitor plug 100. The second fluid supply line 205B leads to a plurality of nozzles 206 for injecting liquid fuel into the combustion chamber 128. Two electronically-activated solenoids 208A, 208B are arranged in series along the first fluid supply line 205A. An electronic control unit 210 interfaces to the fuel pump 202 and the solenoids 208A, 208B.

During combustion start-up operations as shown in FIG. 3, the electronic control unit 210 activates the fuel pump 202 via control line(s) 211 while opening both the solenoid 208A (labeled "start solenoid") and the solenoid 208B (labeled "dump solenoid") via control line(s) 213 and 215, respectively, thereby opening the fluid supply line 205A between the fuel pump 202 and the ignitor plug 100 and causing fuel to flow along the path shown by the highlighted arrow 217. The electronic control unit 210 also supplies a voltage potential across the two terminals 112, 114 of the ignitor plug 100, thereby activating the resistive heating provided by the conductive wire loop 104 of the ignitor plug 100 such that the fuel flowing through the ignitor plug 100 is vaporized and ignited as described above. The flame 218 from the burning vaporized fuel ignites liquid fuel that is injected into the combustion chamber 128 via the second fluid supply line 205B and nozzles 206, thereby allowing for combustion start-up.

In the preferred embodiment, the voltage supplied by the electronic control unit 210 across the terminals 112, 114 of the conductive wire loop 104 is in pulse form. Thus during start-up, fluid continuously flows along fluid supply line 205A toward the ignitor plug 100, but current to the heater coil 104B and ignitor coil 104C is repeatedly turned on and off (pulsed) by application of voltage pulses across the terminals 112, 114. The time period of each voltage pulse may be varied, but is preferably on the order of ten hertz. Pulsing the voltage applied to conductive wire loop 104 in this manner increases the longevity of the conductive wire loop 104, and by extension, the ignitor plug 100. Alternatively, a continuous DC voltage of 7.5 volts may also be applied across the terminals 112, 114 during combustion start-up operations.

During start-up operations, the control unit 210 ramps up the supply of fuel to the combustion chamber 128 and preferably initiates a ramp up of the speed of the rotor of the engine, which accelerates the engine to an idle speed.

After the start-up operations are complete, the electronic control unit 210 transitions to the normal ON mode of operation as shown in FIG. 4. In the normal ON mode, the electronic control unit 210 activates the fuel pump 202 via control line(s) 211 while closing the start solenoid 208A via control line(s) 213 to thereby block the supply of fuel along the fuel supply path 205A. The electronic control unit 210 also ceases the start-up operation pulse voltage (or DC voltage) across the terminals 112, 114 of the ignitor plug 100, thereby de-activating the resistive heating provided by the conductive wire loop 104. Finally, the electronic control unit 210 controls the dump solenoid 208B via line(s) 215 to fluidly couple the fluid supply line 217 leading to the internal channel 120 of the fuel line coupler 118 to a dump fuel line 219, thereby venting the internal channel 120 and fuel channel 106 of the ignitor plug 100 for a predetermined time period (preferably on the order of twenty seconds) such that any liquid fuel that remains therein during the normal ON mode will be exhausted by burner pressure out the dump fuel line 219 as depicted by arrow 221 (FIG. 4). During such predetermined time period, any remaining fuel in the internal channel 120 and the fuel channel 106 is exhausted. At the end of the predetermined time period, the electronic control unit 210 closes the dump solenoid 208B.

In the preferred embodiment, a thermocouple 122 is placed in or adjacent to the combustion chamber 128 in order to detect a temperature rise in the combustion chamber 128 as shown in FIGS. 3 and 4. The thermocouple 122 is electronically coupled to the control unit 210. When the thermocouple 122 measures a predetermined temperature change during start-up operations, which indicates that the fuel in the combustion chamber 128 has ignited, the control unit 210 ramps up the supply of fuel to the combustion chamber 128 (which initiates a ramp up of the speed of the rotor of the engine to an idle speed). The predetermined temperature change at which the control unit 210 initiates the ramp up of the fuel supply (and by extension the speed of the rotor) may be different depending on the type of engine used. For small engines, such predetermined temperature change can be on the order of 10 degrees.

The control unit 210 then switches to an ON mode of operation as discussed above. Advantageously, the venting/fuel dump operations described above significantly reduce the susceptibility of fuel coking in the internal channel 120 and fuel channel 106 of the ignitor plug 100, and thus improve the operational lifetime of the ignitor plug 100.

There have been described and illustrated herein several embodiments of an ignitor plug for heating and igniting combustible fuel that flows therethrough. While particular embodiments of the invention have been described, it is not intended that the invention be limited thereto, as it is intended that the invention be as broad in scope as the art will allow and that the specification be read likewise. Thus, while particular tubular shapes and configurations of an ignitor plug have been disclosed, it will be appreciated that other shapes and configurations can be used as well. For example, it is contemplated that the ignitor plug can be realized from a single elongate member that defines an internal fuel channel and supports the conductive wire loop as described herein. Such an elongate member preferably includes a passageway that is electrically insulated from the internal fuel channel and houses the return portion of the conductive wire loop. In another example, the heater and ignitor coiled sections of the conductive wire loop as described herein can be configured as part of separate conductive loops that are wired in a parallel arrangement. In yet other alternative embodiments, numerous coiled sections could be used to provide resistive heating and ignition of the fuel. Such coiled sections could be wired in series or parallel with an electrical power supply source. While particular terminals have been disclosed for attaching the ends of the conductive wire loop, it will be appreciated that other forms of terminals may be used. In addition, while particular materials and particular combustible fuels have been disclosed, it will be understood that other suitable materials and combustible fuels can be used as well. Also, while it is preferred that pulsed voltage signals are used to drive the conductive wire loop(s) of the ignitor plug, it will be recognized that other suitable electrical power sources such as AC voltage sources can be used as well. In addition, while particular wire resistance values, DC voltage source values, wattage ranges and heating temperature ranges are described, other wire resistance values, DC voltage source values, wattage ranges and heating temperature ranges can be used. While the structure disclosed herein shows a tube within a tube, it will be understood that differently shaped elongated members containing an internal fuel channel could be used, as well as a single elongated member design. Furthermore, while a particular smart fuel supply system is disclosed, it will be understood that the ignitor plugs described herein can be similarly used in a wide variety of combustion applications. It will therefore be appreciated by those skilled in the art that yet other modifications could be made to the provided invention without deviating from its spirit and scope as claimed.

What is claimed is:

1. An apparatus for igniting fluid fuel in a combustion chamber, the apparatus comprising:
    at least one elongate member that defines an internal fuel channel for carrying fuel supplied thereto;
    a conductive wire loop including a heater coil and an ignitor coil, said heater coil separate and distinct from and operably disposed inside of said internal fuel channel for resistive heating of fluid fuel flowing through said internal fuel channel, and said ignitor coil operably disposed downstream of said internal fuel channel for igniting the fluid fuel exiting said internal fuel channel,
    wherein, said heater coil and said ignitor coil are electronically coupled in series, said heater coil is in direct contact with the fluid fuel flowing through said internal fuel channel, and said ignitor coil is in direct contact with fuel exiting said internal fuel channel.

2. An apparatus according to claim 1, further comprising: first and second terminals electronically coupled to respective ends of said conductive wire loop.

3. An apparatus according to claim 1, wherein: said at least one elongate member includes a first member having a lengthwise dimension, and said heater coil extends substantially along the lengthwise dimension of said first member.

4. An apparatus according to claim 1, wherein: said at least one elongate member includes a first member and a second member that surrounds and supports said first member.

5. An apparatus according to claim 4, wherein: said first member has a first lengthwise dimension, and said heater coil extends substantially along said first lengthwise dimension.

6. An apparatus according to claim 1, wherein: said conductive wire loop is realized from nichrome wire.

7. An apparatus according to claim 1, wherein: said heater coil has a resistance in the range between 1.0 and 1.5 ohms.

8. An apparatus according to claim 1, wherein: said igniter coil has a resistance in the range between 0.7 and 1.2 ohms.

9. An apparatus according to claim 1, further comprising: an electrical power source operably coupled to said conductive wire loop, said electrical power source supplying less than 30 W of electrical power to said conductive wire loop for resistive heating of said heater coil in order to heat the fluid fuel flowing through said internal fuel channel.

10. An apparatus according to claim 1, wherein: said at least one elongate member includes a means for coupling to a fuel supply path.

11. An apparatus according to claim 1, wherein: said at least one elongate member includes a means for coupling to a standard threaded port of a combustion chamber.

12. An apparatus according to claim 1, wherein: said conductive wire loop includes two terminals for receiving a pulse mode voltage signal.

13. An apparatus according to claim 1, wherein: said conductive wire loop includes two terminals for receiving a DC voltage signal.

14. An apparatus according to claim 1, further comprising: a means for applying electrical power to said conductive wire loop such that the resistive heating of the fluid fuel causes vaporization of liquid fuel passing through said fuel channel of said at least one elongate member.

15. An apparatus according to claim 14, wherein: said conductive wire loop provides resistive heating at a temperature greater than 1300° F.

16. An apparatus according to claim 14, wherein: said means for supplying electrical power comprises a pulse mode voltage source that supplies a predetermined pulse voltage signal.

17. An apparatus according to claim 14, wherein: said means for supplying electrical power comprises a DC voltage source that supplies a predetermined DC voltage signal.

18. An apparatus according to claim 14, wherein:
said means for supplying electrical power supplies less than 30 W of electrical power to said conductive wire loop for resistive heating of the fluid fuel flowing through said internal fuel channel.

19. A system for controlling ignition in a combustion chamber, the system comprising:
an apparatus according to claim 1, wherein said apparatus has an inlet for receiving fuel and a thermocouple for measuring temperature of said combustion temperature;
a fuel supply line between said apparatus and a fuel pump, said fuel supply line including a start solenoid and a dump solenoid, the fuel supply line supplying liquid fuel to said inlet of said apparatus; and
an electronic control unit operably coupled to said apparatus, said thermocouple, and said start and dump solenoids, said electronic control unit operating in a first mode and a second mode, wherein,
in said first mode, a first set of control signals are supplied to said start and dump solenoids, respectively, to allow for liquid fuel to flow through said fuel supply line to said apparatus, a first electrical power supply signal is applied to said conductive wire loop such that resistive heating of the fluid fuel causes vaporization of the fluid fuel passing through said internal fuel channel of said apparatus along with ignition of vaporized fuel exiting said internal fuel channel of said apparatus, and
in said second mode, a second set of control signals are supplied to said start and dump solenoids, respectively, to prohibit fluid fuel through said fuel supply line to said apparatus, and a second electrical power supply signal is applied to said conductive wire loop to deactivate the resistive heating of the fluid fuel passing through said internal fuel channel of said apparatus and to deactivate the ignition of the fuel exiting said internal fuel channel of said apparatus.

20. A system according to claim 19, wherein:
said thermocouple is mounted adjacent said combustion chamber.

21. A system according to claim 19, wherein:
said electronic control unit interfaces to said thermocouple and initiates switching from said first mode to said second mode when said thermocouple measures a predetermined temperature change during said first mode.

22. A system according to claim 21, wherein:
the combustion chamber is part of a turbine engine having a rotor, and
when said thermocouple measures said predetermined temperature change, said electronic control unit ramps up supply of liquid fuel to said combustion chamber to ramp up speed of the rotor.

23. A system according to claim 19, further comprising:
a fuel dump line for disposing of fuel in said internal fuel channel during said second mode, wherein said second set of control signals operate said dump solenoid to fluidly couple said fuel dump line with said internal fuel channel of said apparatus such that fuel remaining or entering said internal fuel channel of said apparatus flows to said fuel dump line.

24. A system according to claim 19, further comprising:
at least one nozzle located within a combustion chamber, wherein liquid fuel is supplied by said fuel pump to said at least one nozzle in both said first mode and said second mode.

25. A system according to claim 19, wherein:
said conductive wire loop of said ignitor plug provides resistive heating at a temperature greater than 1300° F.

26. A system according to claim 19, wherein:
said conductive wire loop of said ignitor plug has a resistance in a range between 1.7 and 2.2 ohms in its desired operating temperature range.

27. A system according to claim 19, wherein:
said first electrical supply signal provides less than 30 W of electrical power to said conductive wire loop.

28. A system according to claim 19, wherein:
said first and second electrical power supply signals comprise predetermined DC voltage signals.

29. A system according to claim 19, wherein:
said first and second electrical power supply signals comprise predetermined DC voltage pulses.

30. A system according to claim 19, wherein:
during said first mode, said electronic control unit adjusts a time period and voltage of said first electrical power supply signal in accordance with output of said thermocouple.

* * * * *